(12) United States Patent
Sakaida (10) Patent No.: US 10,664,221 B2
(45) Date of Patent: May 26, 2020

(54) DISPLAY DEVICE, DISPLAY SYSTEM, AND NON-TRANSITORY COMPUTER READABLE MEDIUM

(71) Applicant: FUJI XEROX CO., LTD., Tokyo (JP)

(72) Inventor: Hiroshi Sakaida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 75 days.

(21) Appl. No.: 15/811,357

(22) Filed: Nov. 13, 2017

(65) Prior Publication Data

US 2018/0275947 A1 Sep. 27, 2018

(30) Foreign Application Priority Data

Mar. 24, 2017 (JP) .................................. 2017-059835

(51) Int. Cl.
*G06F 16/78* (2019.01)
*G06F 3/14* (2006.01)

(52) U.S. Cl.
CPC .......... *G06F 3/1454* (2013.01); *G06F 3/1423* (2013.01); *G09G 2330/02* (2013.01); *G09G 2330/021* (2013.01); *G09G 2330/026* (2013.01); *G09G 2358/00* (2013.01); *G09G 2370/022* (2013.01); *G09G 2370/06* (2013.01); *G09G 2370/16* (2013.01); *G09G 2380/08* (2013.01)

(58) Field of Classification Search
CPC ... G06F 21/84; G06F 2209/5014; G06F 3/048
See application file for complete search history.

(56) References Cited

U.S. PATENT DOCUMENTS

| | | | |
|---|---|---|---|
| 5,677,895 A * | 10/1997 | Mankovitz | H03J 9/00 348/563 |
| 5,867,224 A * | 2/1999 | Suh | H04N 5/44513 348/553 |
| 6,271,893 B1 * | 8/2001 | Kawaguchi | H04H 20/42 348/725 |
| 2002/0184626 A1 * | 12/2002 | Darbee | G06F 3/147 725/39 |
| 2003/0066080 A1 * | 4/2003 | Kamieniecki | H04N 5/44513 725/80 |
| 2006/0072603 A1 * | 4/2006 | Kamise | G04G 19/10 370/432 |
| 2007/0130592 A1 * | 6/2007 | Haeusel | G06F 1/1632 725/81 |
| 2009/0055530 A1 * | 2/2009 | Pince | H04L 29/06027 709/224 |
| 2010/0220870 A1 * | 9/2010 | Ieda | G01C 21/3688 381/86 |

(Continued)

FOREIGN PATENT DOCUMENTS

| | | |
|---|---|---|
| JP | 2002-125264 A | 4/2002 |
| JP | 2004-007275 A | 1/2004 |
| JP | 2009-044659 A | 2/2009 |

*Primary Examiner* — Olga V Merkoulova
(74) *Attorney, Agent, or Firm* — Oliff PLC (57) ABSTRACT

A display device includes a display, a reception unit, a power supply unit, and a controller. The reception unit receives data to be displayed on the display. The power supply unit supplies power to the reception unit. The controller controls whether or not to permit the data to be displayed on the display, based on an instruction for power supply to the reception unit from the power supply unit.

14 Claims, 6 Drawing Sheets

(56) References Cited

U.S. PATENT DOCUMENTS

| | | | |
|---|---|---|---|
| 2014/0092304 A1* | 4/2014 | Chen | H04N 21/4126 |
| | | | 348/552 |
| 2014/0333842 A1* | 11/2014 | Choi | H04N 21/42207 |
| | | | 348/734 |
| 2016/0321730 A1* | 11/2016 | Yonaha | G06Q 30/0627 |
| 2017/0164214 A1* | 6/2017 | Hara | H04B 17/318 |
| 2018/0275947 A1* | 9/2018 | Sakaida | G06F 3/1423 |

* cited by examiner

DISPLAY DEVICE, DISPLAY SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-059835 filed Mar. 24, 2017.

BACKGROUND

Technical Field

The present invention relates to a display device, a display system, and a non-transitory computer-readable medium.

SUMMARY

According to an aspect of the invention, there is provided a display device including a display, a reception unit, a power supply unit, and a controller. The reception unit receives data to be displayed on the display. The power supply unit supplies power to the reception unit. The controller controls whether or not to permit the data to be displayed on the display, based on an instruction for power supply to the reception unit from the power supply unit.

BRIEF DESCRIPTION OF THE DRAWINGS

Exemplary embodiments of the present invention will be described in detail based on the following figures, wherein.

DETAILED DESCRIPTION

Exemplary Embodiments of the present invention will be described with reference to drawings.

Figure 1:
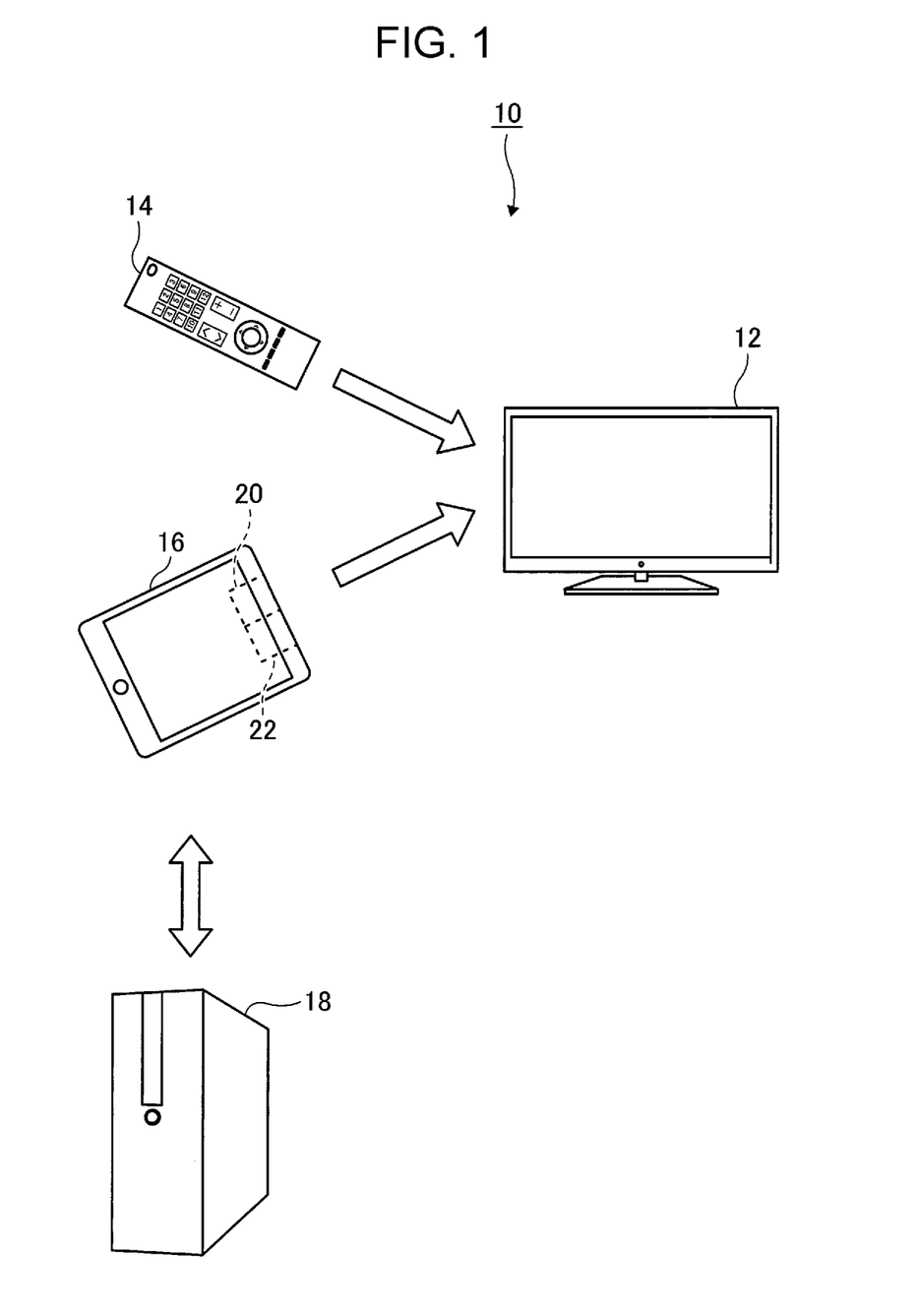
FIG. 1 is a configuration diagram illustrating a display system according to an exemplary embodiment of the present invention.

FIG. 1 illustrates a display system 10 according to an exemplary embodiment of the present invention. The display system 10 is provided, for example, at a medical setting such as a hospital. The display system 10 includes a television (television receiver) 12 as a display device, a remote controller 14, a terminal device 16 such as a tablet, and a server 18.

The display device 12 is arranged, for example, in the vicinity of a patient's bed, and is configured to display diagnostic data as well as normal television programs. The remote controller 14 is, for example, of an infrared type. The remote controller 14 includes buttons or the like for turning on and off the power of the television, adjusting the volume of sound, designating a program, or the like. The remote controller 14 issues an instruction to the display device 12 using the buttons or the like. The terminal device 16 includes a touch panel. Diagnostic data to be presented to patients is stored in the terminal device 16. The terminal device 16 also includes a first transmitting unit 20 that transmits patient data and a second transmitting unit 22 that issues a power supply instruction to a receiver of the display device 12, which will be described later.

The first transmitting unit 20 performs transmission in a wireless gigabit (WiGig) method. WiGig represents short-range high-speed digital wireless communication that is standardized by IEEE 802.11ad, and adopts millimeter radio waves at a frequency of 60 GHz, with a high communication speed of at most 7 Gbps. Because of a strong directivity, the first transmitting unit 20 needs to be directed toward the display device 12 for communication with the display device 12.

The second transmitting unit 22 is, for example, of an infrared type. When a power supply signal is transmitted from the second transmitting unit 22, power is supplied to a first receiver (WiGig receiver) 26 of the display device 12, which will be described later.

The server 18 stores diagnostic data of patients, and transmits diagnostic data of a requested patient to the terminal device 16.

Figure 2:
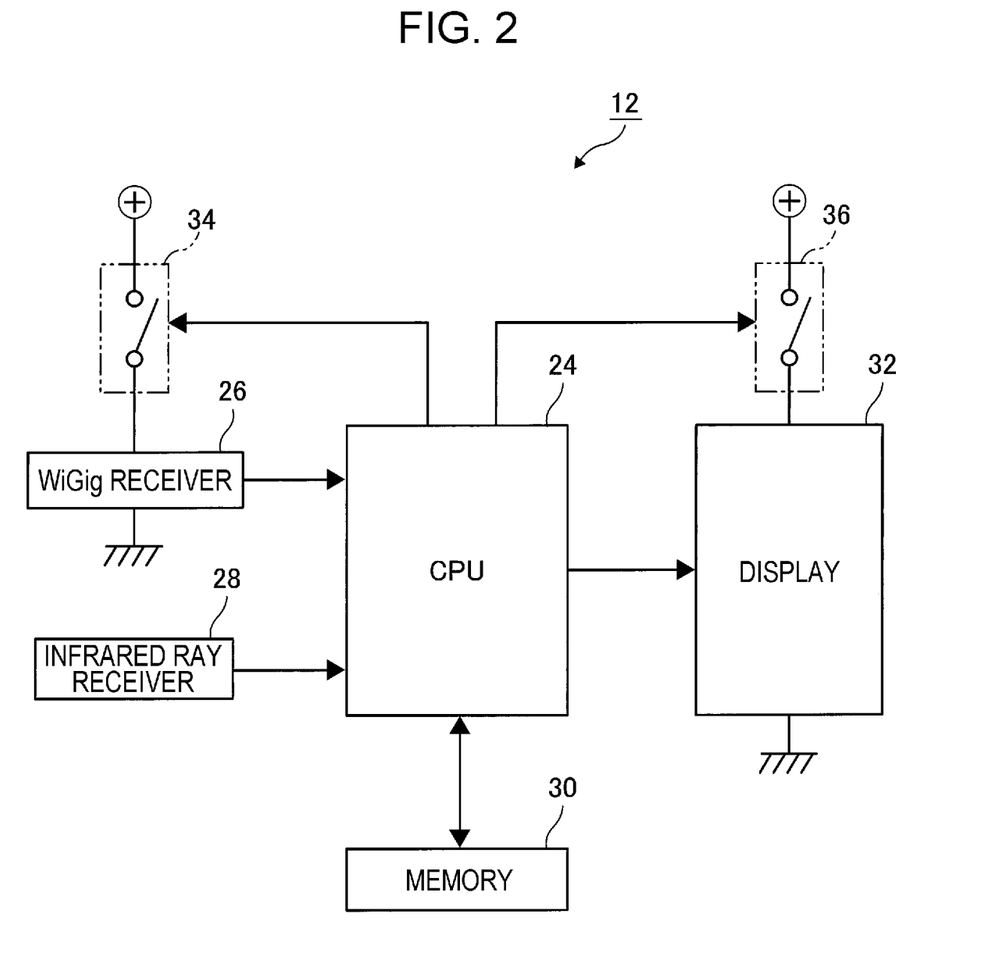
FIG. 2 is a block diagram illustrating a circuit example of a display device used in an exemplary embodiment of the present invention.

FIG. 2 illustrates a circuit example of the display device 12.

The display device 12 includes a central processing unit (CPU) 24 as a controller. The first receiver (WiGig receiver) 26 and a second receiver (infrared ray receiver) 28 are connected to the CPU 24. A memory 30 that stores programs and data is also connected to the CPU 24. Furthermore, a display 32 is connected to the CPU 24 so that data transmitted from the CPU 24 is displayed on the display 32.

A first switch 34 is connected between the power source and the first receiver 26. Turning on and off of the first switch 34 is controlled in accordance with a control signal from the CPU 24. A second switch 36 is connected between the power source and the display 32. As with the first switch 34, turning on and off of the second switch 36 is also controlled in accordance with a control signal from the CPU 24.

Figure 3:
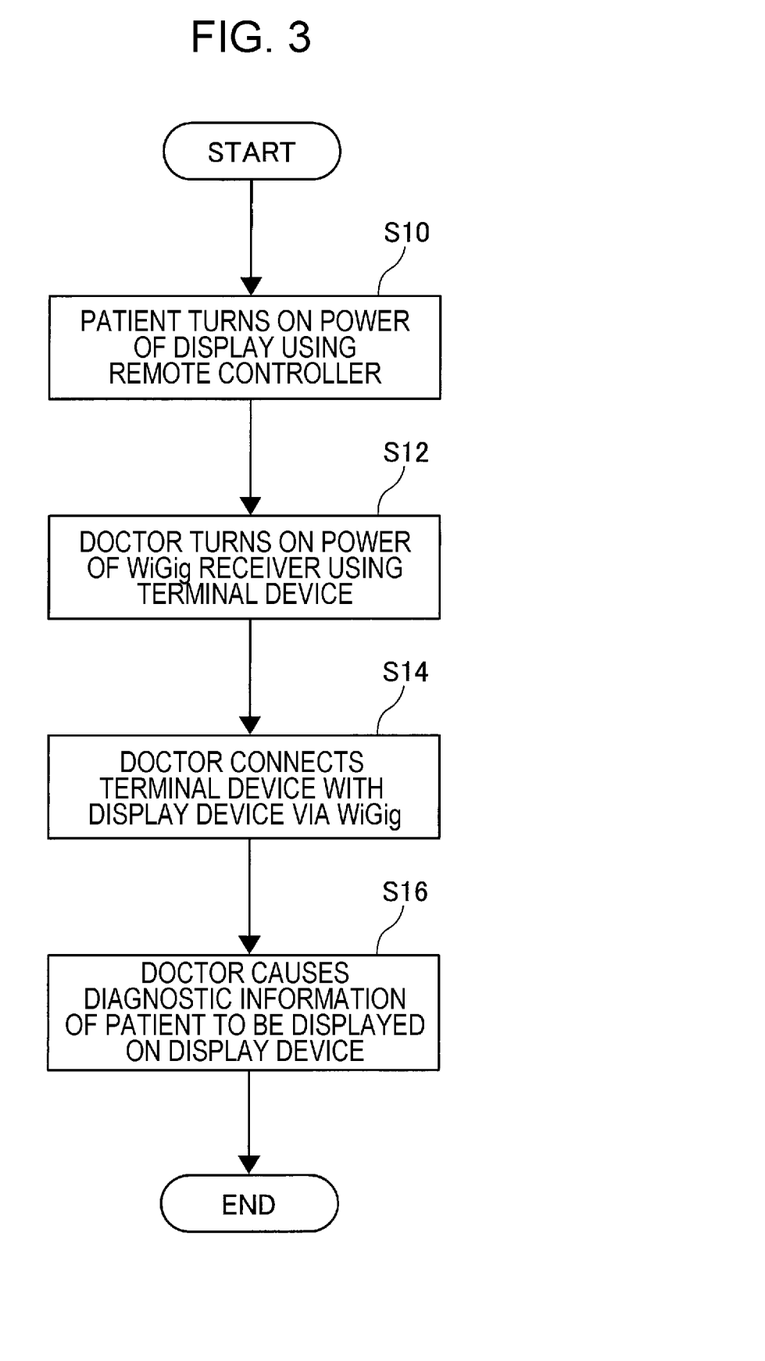
FIG. 3 is a flowchart illustrating an example of the flow of a process of a display system according to an exemplary embodiment of the present invention.

FIG. 3 is a flowchart illustrating an example of the flow of a process of the display system.

First, in step S10, a patient turns on the power of the display device 12 using the remote controller 14. Even if the display 32 of the display device 12 is turned on, a WiGig access point of the display device 12 may not be viewed on the terminal device 16 of a doctor unless the first receiver 26, which is independent of the display 32, is turned on. To avoid confusion in the case where individual access points of plural display devices 12 are displayed, an access point of only a desired display device 12 is displayed.

In step S12, a doctor turns on the power of the first receiver 26 using the second transmitting unit 22 of the terminal device 16. After this procedure, the WiGig access point of the display device 12 may be viewed on the terminal device 16. Because of a high directivity of WiGig, the terminal device 16 may be directed toward the desired display device 12.

In step S10, the patient turns on the power of the display device 12 using the remote controller 14. However, at the same time in step S12 or before or after step S12, the power of the display device 12 may be turned on using the terminal device 16.

Furthermore, a unique number may be transmitted along with a diagnostic data transmission start instruction, so that power may be supplied to the first receiver only when a permitted number is received. Accordingly, restriction is set such that the power of the first receiver reacts only to a permitted tablet terminal.

Furthermore, by providing a shutter at the second receiver 28 of the display device 12, the power of the first receiver 26 may not be turned on unless the shutter is opened.

In step S14, the doctor connects the terminal device 16 with the display device 12 via WiGig.

In step S16, the doctor causes diagnostic data of the patient to be displayed on the display device 12. Serial numbers are assigned to diagnostic data.

Figure 4:
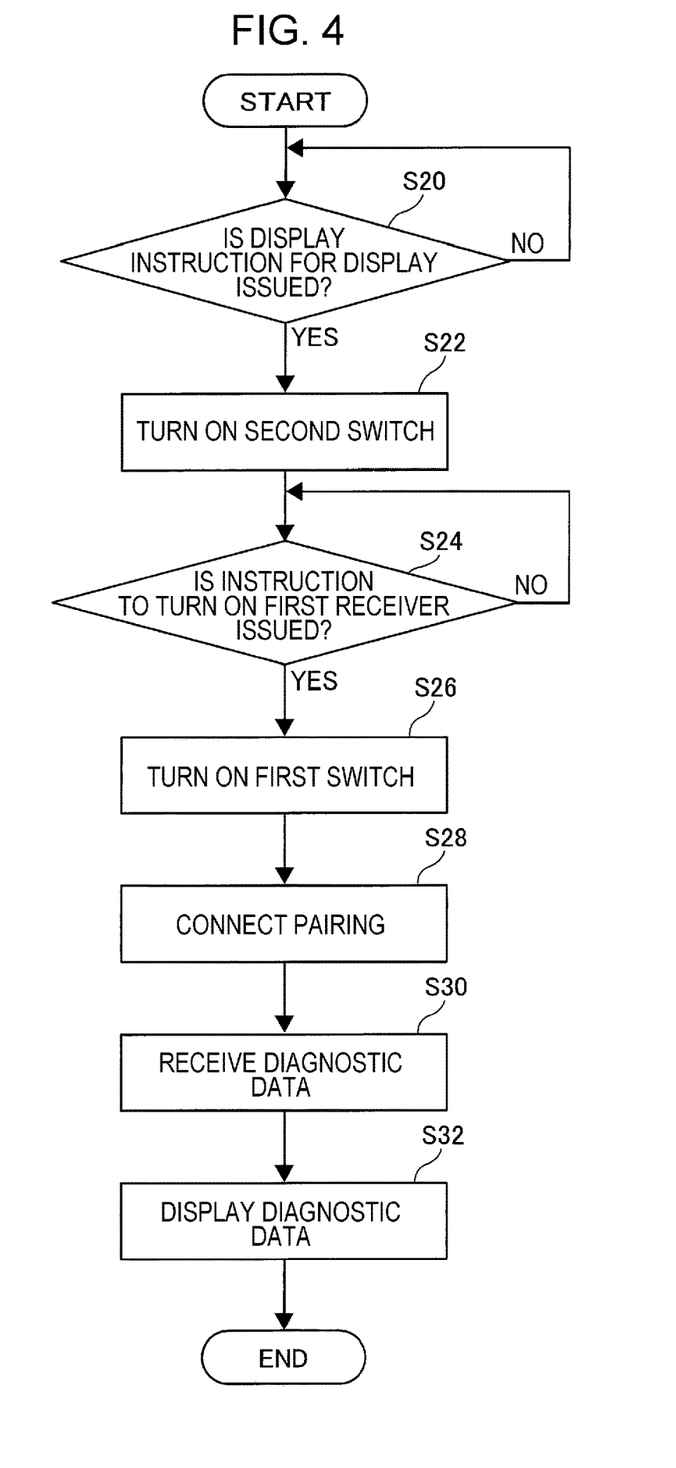
FIG. 4 is a flowchart of a program executed by a central processing unit of a display device according to an exemplary embodiment of the present invention.

FIG. 4 is a flowchart of a program executed by the CPU 24.

First, in step S20, the CPU 24 monitors whether or not an instruction for display on the display 32 is issued to the second receiver 28 from the remote controller 14. In the case where it is determined that an instruction is issued from the remote controller 14, the process proceeds to step S22.

In step S22, the CPU 24 transmits an ON signal to the second switch 36, and power is thus supplied to the display 32.

In step S24, the CPU 24 monitors whether or not an ON instruction is issued to the first receiver 26 from the first transmitting unit 20 of the terminal device 16.

In the case where it is determined that an ON instruction is issued to the first receiver 26, the process proceeds to step S26. In step S26, the CPU 24 transmits an ON signal to the first switch 34, and power is thus supplied to the first receiver 26.

In step S28, pairing processing is performed. When pairing is established, the CPU 24 receives diagnostic data from the first receiver 26 in step S30, and the CPU 24 causes the diagnostic data to be displayed on the display 32.

Figure 5:
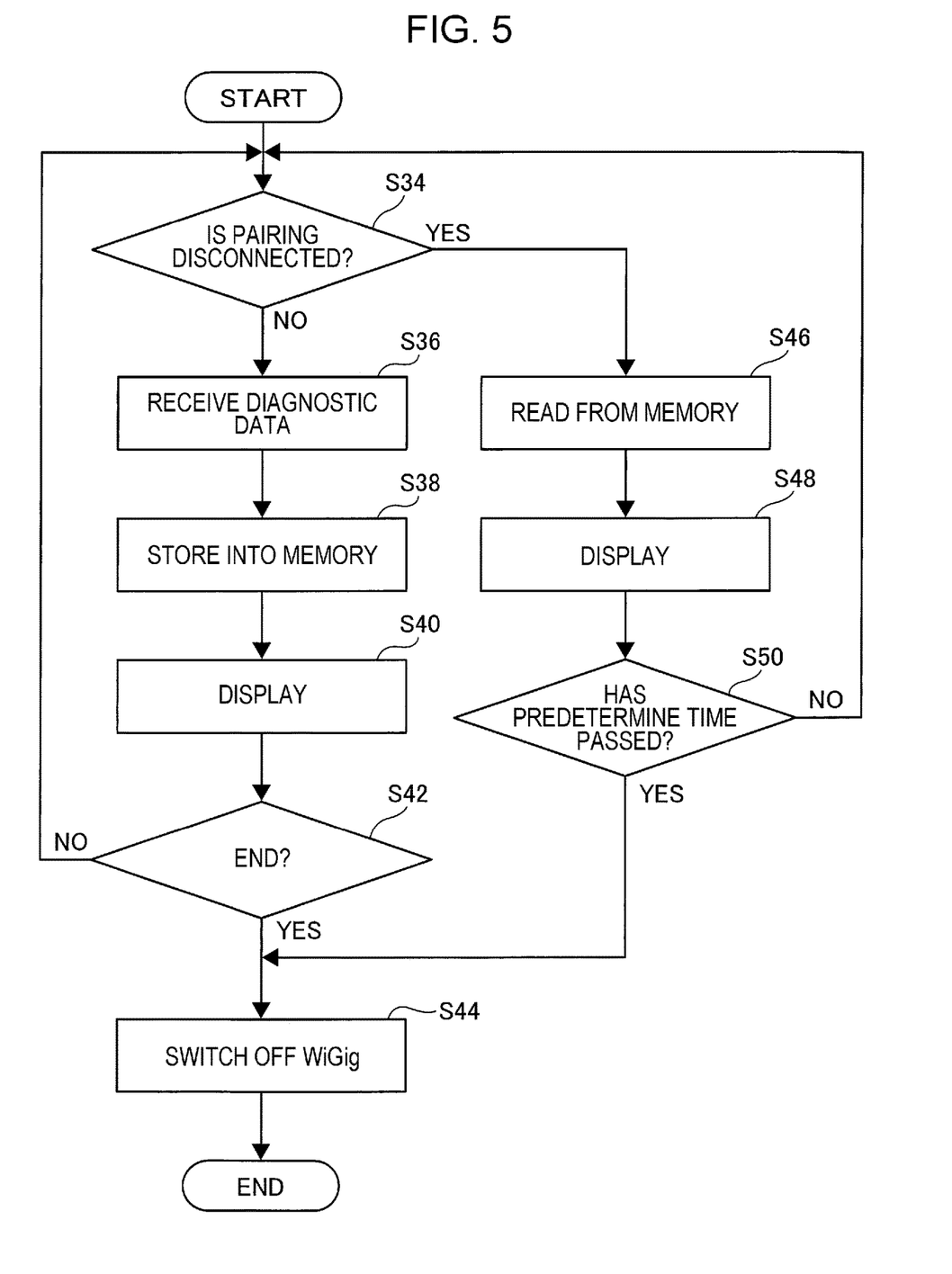
FIG. 5 is a flowchart illustrating a process for a case where pairing is disconnected in an exemplary embodiment of the present invention.

FIG. 5 is a flowchart illustrating a process for a case where pairing is disconnected. Because of a high directivity of WiGig, in order to maintain connection between the terminal device 16 and the display device 12, the terminal device 16 needs to be always directed toward the display device 12. For an easier use, a serial number linked to diagnostic data is stored in the memory 30 of the display device 12 at a point in time when pairing is finished, and the transmitted diagnostic data is displayed on the display device 12 within a predetermined time even if pairing is disconnected.

That is, in step S34, it is determined whether or not pairing is disconnected. In the case where pairing is not disconnected, the process proceeds to step S36 in which diagnostic data is received. In step S38, the diagnostic data is stored along with a corresponding serial number in the memory 30. In step S40, the diagnostic data received in step S36 is displayed on the display 32. In Step S42, it is determined whether or not a termination signal is received from the terminal device 16. In the case where it is determined in step S42 that a termination signal is not received from the terminal device 16, the process returns to step S34. In contrast, in the case where it is determined in step S42 that a termination signal is received from the terminal device 16, the process proceeds to step S44 in which the first switch 34 is turned off, and the process ends.

In the case where it is determined in step S34 that pairing is disconnected, the process proceeds to step S46. In step S46, the diagnostic data stored in step S38 is read. In step S48, the diagnostic data read in step S46 is displayed on the display 32. In step S50, it is determined whether or not a predetermined time has passed since pairing is disconnected. In the case where it is determined in step S50 that a predetermined time has not passed since pairing is disconnected, the process returns to step S34. In contrast, in the case where it is determined in step S50 that a predetermined time has passed since pairing is disconnected, the process proceeds to step S44 in which the first switch 34 is turned off, and the process ends.

Figure 6:
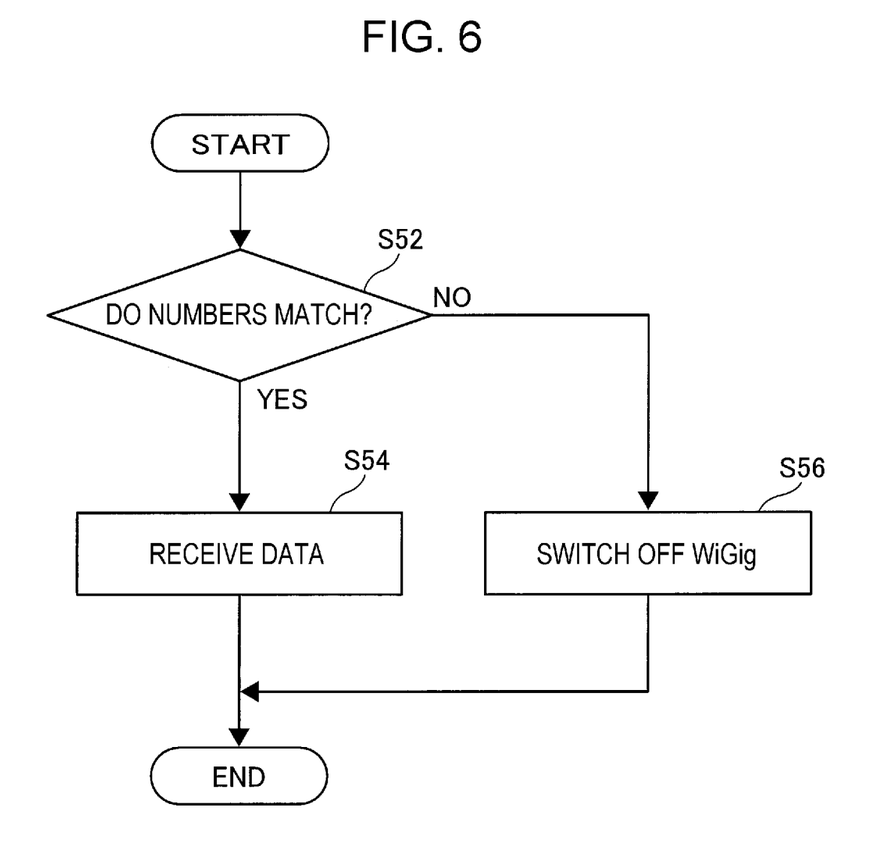
FIG. 6 is a flowchart illustrating a process for a case where connection is reestablished in an exemplary embodiment of the present invention.

FIG. 6 is a flowchart illustrating a process for a case where connection is reestablished.

For reconnection, the number of desired diagnostic data is input. Input of the number may be performed by automatically extracting the number stored in the terminal device 16 and transmitting the extracted number or manually inputting the number by a doctor using the terminal device 16. In step S52, it is determined whether or not the serial number stored in the memory 30 matches the input number. In the case where the numbers match, the process proceeds to step S54 in which reception of diagnostic data is permitted. In contrast, in the case where it is determined in step S52 that the numbers do not match, the process proceeds to step S56 in which the first switch 34 is turned off, power supply to the first receiver 26 is stopped, and WiGig communication is prohibited. This is because there is a possibility that data is transmitted from a wrong terminal device in the case where the numbers do not match.

In the above exemplary embodiments, a tablet is illustrated as an example of the terminal device 16. However, the present invention is not limited to this. The terminal device 16 may be a personal computer of a laptop type or the like, a smartphone, a dedicated terminal device, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
 a display;
 a first reception unit configured to receive, from a terminal device: (i) data to be displayed on the display, and (ii) an instruction to supply power to the first reception unit;
 a second reception unit configured to receive, from a remote controller, an instruction to supply power to the display, the first reception unit and the second reception unit being different from each other;
 a power source configured to supply power to the first reception unit, the instruction to supply power to the first reception unit being an instruction for the power source to supply power to the first reception unit;
 a first switch connected between the power source and the first reception unit;
 a second switch connected between the power source and the display; and a controller configured to:
  control turning on and off of the second switch in accordance with a control signal transmitted by the controller to the second switch based on a determination of whether or not to permit the data to be displayed on the display, based on whether or not the first reception unit has received the instruction from the terminal device for the power source to supply power to the first reception unit, and
  control turning on and off of the first switch in accordance with a control signal transmitted by the controller to the first switch based on whether or not the first reception unit has received the instruction from the terminal device for the power source to supply power to the first reception unit.

2. The display device according to claim 1,
wherein the controller performs control such that the data is permitted to be displayed on the display in a case where power is supplied to the first reception unit from the power supply unit.

3. The display device according to claim 1,
wherein the controller performs control such that the data is prohibited from being displayed on the display in a case where power is not supplied to the first reception unit from the power source.

4. The display device according to claim 1,
wherein the first reception unit receives the data via WiGig that is standardized by IEEE 802.11ad.

5. The display device according to claim 1, further comprising:
  a memory configured to store the data received by the first reception unit,
  wherein the controller performs control such that the data stored in the memory is displayed on the display in a case where communication of the first reception unit is disconnected.

6. The display device according to claim 5,
wherein the controller performs control such that the data stored in the memory is displayed on the display in a case where a communication disconnection time of the first reception unit is less than or equal to a predetermined value.

7. The display device according to claim 5,
wherein the controller performs control such that the data stored in the memory is prohibited from being displayed on the display in a case where a communication disconnection time of the first reception unit is more than a predetermined value.

8. The display device according to claim 1, further comprising:
  a memory configured to store the data received by the first reception unit and a number assigned to the data,
  wherein the controller performs control such that the data is displayed on the display in a case where communication of the first reception unit is reestablished and an input number matches the number stored in the memory.

9. The display device according to claim 1, further comprising:
  a memory configured to store the data received by the first reception unit and a number assigned to the data,
  wherein the controller performs control such that the data is not displayed on the display in a case where communication of the first reception unit is reestablished and an input number does not match the number stored in the memory.

10. A display device comprising:
a display;
a first reception unit configured to receive, from a terminal device: (i) data to be displayed on the display, and (ii) an instruction to supply power to the first reception unit;
a second reception unit configured to receive, from a remote controller, an instruction to supply power to the display, the first reception unit and the second reception unit being different from each other;
a first power source configured to supply power to the display, based on an instruction received from a remote controller instructing the first power source to supply power to the display;
a second power source configured to supply power to the first reception unit, the instruction to supply power to the first reception unit being an instruction for the second power source to supply power to the first reception unit;
a first switch connected between the second power source and the first reception unit;
a second switch connected between the power source and the display; and
a controller configured to:
  control turning on and off of the second switch in accordance with a control signal transmitted by the controller to the second switch based on a determination of whether or not to permit the data to be displayed on the display, based on whether or not: (i) the instruction from the remote controller instructing the first power source to supply power to the display has been received, and (ii) the first reception unit has received the instruction from the terminal device for the second power source to supply power to the first reception unit; and
  the controller to the first switch based on whether or not the first reception unit has received the instruction from the terminal device for the power source to supply power to the first reception unit.

11. The display device according to claim 10,
wherein the controller performs control such that the data is permitted to be displayed on the display in a case where power is supplied to the display by the first power source and power is supplied to the first reception unit by the second power source.

12. The display device according to claim 10,
wherein the controller performs control such that the data is prohibited from being displayed on the display in a case where power is not supplied to the display by the first power source or power is not supplied to the first reception unit by the second power source.

13. A display system comprising:
a display device including:
  a display,
  a terminal device,
  a first reception unit configured to receive, from the terminal device: (i) data to be displayed on the display, and (ii) an instruction to supply power to the first reception unit,
  a second reception unit configured to receive, from a remote controller, an instruction to supply power to the display, the first reception unit and the second reception unit being different from each other,
  a power source configured to supply power to the first reception unit, the instruction to supply power to the first reception unit being an instruction for the power source to supply power to the first reception unit, and a first switch connected between the power source and the first reception unit;

a second switch connected between the power source and the display;

a controller configured to:

control turning on and off of the second switch in accordance with a control signal transmitted by the controller to the second switch based on a determination of whether or not to permit the data to be displayed on the display, based on whether or not the first reception unit has received the instruction from the terminal device for the power source to supply power to the first reception unit, control turning on and off of the first switch in accordance with a control signal transmitted by the controller to the first switch based on whether or not the first reception unit has received the instruction from the terminal device for the second power source to supply power to the first reception unit; and the terminal device including:

a transmitting unit configured to transmit the data to the first reception unit of the display device, and an instruction unit configured to transmit, to the controller, the instruction for the power source to supply power to the first reception unit.

14. A non-transitory computer readable medium storing a program causing a computer to execute a process for display, the process comprising:

receiving, from a terminal device: (i) data via a first reception unit, the data to be displayed on a display, and (ii) an instruction to supply power to the first reception unit, the instruction to supply power to the first reception unit being an instruction for a power source to supply power to the first reception unit;

receiving, by a second reception unit, an instruction from a remote controller to supply power to the display, the first reception unit and the second reception unit being different from each other, wherein a first switch is connected between the power source and the first reception unit, and a second switch is connected between the power source and the display;

controlling turning on and off of the second switch in accordance with a control signal transmitted by the controller to the second switch based on a determination of whether or not to permit the data to be displayed on the display, based on whether or not the first reception unit has received the instruction from the terminal device to supply power to the first reception unit; and control turning on and off of the first switch in accordance with a control signal transmitted by the controller to the first switch based on whether or not the first reception unit has received the instruction from the terminal device for the power source to supply power to the first reception unit.

* * * * *